(12) United States Patent
Korn (10) Patent No.: US 6,542,906 B2
(45) Date of Patent: Apr. 1, 2003

(54) METHOD OF AND AN APPARATUS FOR MERGING A SEQUENCE OF DELTA FILES

(75) Inventor: Christian M. Korn, London (GB)

(73) Assignee: Connected Place Ltd., London (GB)

( * ) Notice: Subject to any disclaimer, the term of this patent is extended or adjusted under 35 U.S.C. 154(b) by 0 days.

(21) Appl. No.: 09/375,375

(22) Filed: Aug. 17, 1999

(65) Prior Publication Data
US 2002/0169740 A1 Nov. 14, 2002

(30) Foreign Application Priority Data

Oct. 13, 1998 (GB) ............................................. 9822349
Aug. 17, 1998 (GB) ............................................. 9817921

(51) Int. Cl.[7] ............................................. G06F 17/30
(52) U.S. Cl. .................................. 707/203; 707/103 R
(58) Field of Search ................................ 707/201–204, 707/1–8, 103 R, 103

(56) References Cited

U.S. PATENT DOCUMENTS

| 5,479,654 | A | * | 12/1995 | Squibb | 707/201 |
| 5,634,052 | A | * | 5/1997 | Morris | 707/1 |
| 5,729,743 | A | * | 3/1998 | Squibb | 707/203 |
| 5,745,906 | A | * | 4/1998 | Squibb | 707/203 |
| 5,813,017 | A | * | 9/1998 | Morris | 707/204 |
| 5,893,119 | A | * | 4/1999 | Squbb | 707/1 |
| 6,018,747 | A | * | 1/2000 | Burns et al. | 707/203 |
| 6,233,589 | B1 | * | 5/2001 | Balcha et al. | 707/203 |

* cited by examiner

Primary Examiner—John Breene
Assistant Examiner—Mohammad Ali
(74) Attorney, Agent, or Firm—Burns, Doane, Swecker & Mathis, L.L.P.

(57) ABSTRACT

A method of and an apparatus for merging a sequence of delta files is described. The delta files together define a series of changes between a base file and an updated file, each delta file defining one or more changes in terms of one or more unique tokens each identifying original data or of one or more reused tokens identifying data reused from the immediately preceding delta file or the base file. The method comprises creating an initial merge structure from the base file and the first delta file in the sequence. A further merge structure is created from the initial merge structure and the next delta file in the sequence by comparing tokens in the initial merge structures and replacing reused tokens in the further merge structure with tokens in the initial merge structure. The initial merge structure is then replaced with the further merge structure so that the further merge structure becomes the initial merge structure. The operations of creating a further merge structure and replacing the initial merge structure with a further merge structure is repeated for all delta files in sequence order. The thus created merge structure represents all changes between the base file and the updated file. The apparatus, which may comprise a suitably configured computer, comprises means suitable for carrying out the method steps.

29 Claims, 8 Drawing Sheets

METHOD OF AND AN APPARATUS FOR MERGING A SEQUENCE OF DELTA FILES

FIELD OF THE INVENTION

The invention relates to a method of and apparatus for merging a sequence of delta files. In the sequence, the delta files define a series of changes between a base file and an updated file.

BACKGROUND OF THE INVENTION

Co-pending British patent application no. 9817922.9, the teachings of which are incorporated herein by reference, describes a method of producing a checkpoint which describes a base file and a method of generating a difference file defining differences between an updated file and a base file. A checkpoint which describes a base file is produced by dividing the base file into a series of segments; generating for each segment a segment description; and creating from the generated segment descriptions a segment description structure as the checkpoint. The segment descriptions represent segments of the base file at a minimum level of resolution sufficient to represent distinctly the segment. A difference or delta file which defines differences between an updated file and the base file is produced by generating at different levels of resolution segment descriptions for segments in the updated file and comparing the generated segment descriptions with segment descriptions in the checkpoint to identify matching and non-matching segments. Data identifying segments in the updated file that match segments in the base file and data representing portions of the updated file at a minimum level of resolution sufficient to represent distinctly the portion are stored as the delta file.

Merging delta files by applying the first delta file to the base file, then applying the next delta file to the created file and so forth requires a significant amount of a backup repository's CPU time. This is especially so when the number of delta files reaches several thousands and a reconstruction of the latest version is required on a daily basis.

One existing method of merging delta files is the iterative build method which successively merges a base file with one or two delta files, thus writing and reading a base file once for every delta file a base file is merged as with. When merging N delta files with a base file, the number of I/O operations is equal to (2N+1)·[number of bytes in the base file]

An approach to overcome the poor performance of iterative build methods is disclosed in U.S. Pat. No. 5,745,906 to Squibb. This specification describes a method which is said to use 2·[number of bytes in the base file] I/O operations to merge a sequence of delta files. However, Squibb does not include the number of I/O operations required by the search requests used to merge delta files. Squibb's method processes the delta files starting with the latest one and initiating search requests in previous versions. This approach cannot be used in an environment where delta files can only be provided in the order they were created in, e.g. backup repositories on magnetic tapes. Furthermore, even 2·[number of bytes in the base file] I/O operations may be impractical in situations where big files (e.g. database files) have been backed up several times, but have only changed very little between each backup.

Squibb uses a one Gigabyte database with a typical 0.5% change as an example to point out the advantages of his algorithm. Such a database would typically lead to 5.1 Megabyte delta files with the method described in our aforementioned co-pending patent application. Thus, merging 50 such delta files would require at least 2 billion I/O operations using Squibb's method. Using the methods to be described hereinbelow would only require about one eighth of Squibb's 2 billion, i.e. 255 million I/O operations.

SUMMARY OF THE INVENTION

The invention aims to provide a method and apparatus which reduces the number of operations carried out by the CPU at a backup repository.

As daily or even more frequent backups of files soon produce big numbers of delta files, each corresponding to one version in the history of the file, normally most of the versions become obsolete. However, the obsolete delta files cannot just be deleted, as the information contained in them might be needed to reconstruct later versions. Therefore, to save time when reconstructing a version and space in the backup repository, a method to combine a sequence of delta files to create one delta file is needed. The invention also aims to provide an efficient apparatus and method for deleting a sequence of delta files and replacing them with one combined delta file without losing the capability to restore later versions.

Another aim of the invention is to provide a method and apparatus to merge delta files in a way that only needs the presence of one delta file at any time and processes the delta files in the order they were created.

The invention further aims to provide a method of merging delta files in such a way that the number of I/O operations needed is equal to the sum of the bytes in the delta files being merged.

The invention aims to provide a method of maintaining tokens in delta files in such a way that a restore operation only requires those delta files that hold unique bytes actually used in the version to be restored. The same method can be used for deleting intermediate versions. This enables a data structure filled by information from the first of a sequence of delta files to be created. The data structure is then updated by consecutively reading and analysing the remaining delta files. The data structure might be held in a disk file or, for additional performance, in memory. The merging the sequence of delta files may be used to create one or more bi-directional delta files which allow reconstruction of updated files with reduced I/O operations, or even bi-directional delta files without any references to previous delta files. Bi-directional delta files allow reconstruction of a base file given the updated file and the special bi-directional file.

The merging of a sequence of delta files is broken down to merging two data structures by replacing all references to a previous delta file with a reference to the actual location where the bytes in question are held or by replacing those references with the bytes in case of using the method and apparatus in an environment where multiple accesses of delta files are not practical or impossible (e.g. backup repositories held on magnetic tapes).

The invention aims to provide a method where the tokens associated with a delta file hold information about the particular version the unique bytes involved are held in. This enables restores and deletes to access only those delta files that are needed for the operation without having to scan through other delta files.

According to one aspect of the invention there is provided a method of merging a sequence of delta files that together define a series of changes between a base file and an updated file, each delta file defining one or more changes in terms of one or more unique tokens each identifying original data or of one or more reuse tokens identifying data reused from the immediately preceding delta file or the base file, the method comprising: creating an initial merge structure from the base file and the first delta file in the sequence; creating a further merge structure from the initial merge structure and the next delta file in the sequence by comparing tokens in the initial and further merge structures and replacing reuse tokens in the further merge structure with tokens in the initial merge structure; replacing the initial merge structure with the further merge structure so that the further merge structure becomes the initial merge structure; and repeating the operations of creating a further merge structure and replacing the initial merge structure with the further merge structure, for all delta files in sequence order, whereby the thus created merge structure represents all changes between the base file and the updated file.

According to another aspect of the invention there is provided a method of creating a current file from an initial file and a set of difference files that defines a sequence of changes between the initial file and the current file, the method comprising: merging the difference files to remove redundant information therefrom and thus create a changes file representing all changes to be applied to the initial file in order to arrive at the current file; and modifying the initial file using the information in the changes file.

According to a further aspect of the invention there is provided an apparatus for merging a sequence of delta files that together define a series of changes between a base file and an updated file, each delta file defining one or more changes in terms of one or more unique tokens each identifying original data or of one or more reuse tokens identifying data reused from the immediately preceding delta file or the base file, the apparatus comprising: means for creating an initial merge structure from the base file and the first delta file in the sequence; means for creating a further merge structure from the initial merge structure and the next delta file in the sequence by comparing tokens in the initial and further merge structures and replacing reuse tokens in the further merge structure with tokens in the initial merge structure; means for replacing the initial merge structure with the further merge structure so that the further merge structure becomes the initial merge structure; and means for repeating the operations of creating a further merge structure and replacing the initial merge structure with the further merge structure, for all delta files in sequence order, whereby the thus created merge structure represents all changes between the base file and the updated file.

According to another aspect of the invention there is provided an apparatus for creating a current file from an initial file and a set of difference files that defines a sequence of changes between the initial file and the current file, the apparatus comprising: means for merging the difference files to remove redundant information therefrom and thus create a changes file representing all changes to be applied to the initial file in order to arrive at the current file; and means for modifying the initial file using the information in the changes file.

The above and further features of the invention are set forth with particularity in the appended claims and together with advantages thereof will become clearer from consideration of the following detailed description of an exemplary embodiment of the invention given with reference to the accompanying drawings.

DESCRIPTION OF AN EMBODIMENT OF THE INVENTION

In the following there will be described a method of and apparatus for merging a sequence of delta files, wherein each delta file holds information reflecting the changes between a base file and an updated file, and wherein the updated file of a delta file in the sequential plurality of delta files is the base file associated with the next delta file in the sequential plurality. The method and apparatus provides for: 1) merging a sequence of delta files to reconstruct an updated file; 2) merging a sequence of delta files to compile a delta file reflecting the combination of all changes stored in the sequential plurality of delta files; 3) creating a bi-directional delta file which allows reconstruction of versions without the necessity to access all previous delta files and/or 4) creating a special bi-directional delta file that allow the reconstruction of the associated base file without accessing any previous delta files.

The method and apparatus. may be used in conjunction with a computer backup process, version manager or similar applications.

As daily or even more frequent backups of files soon produce big numbers of delta files, each corresponding to one version in the history of the file, normally most of the versions become obsolete. However, the obsolete delta files cannot just be deleted, as the information contained in them might be needed to reconstruct later versions. The following method aims, therefore, to save time during reconstruction and space in the backup repository by combining a sequence of delta files to create one delta file.

Figure 1:
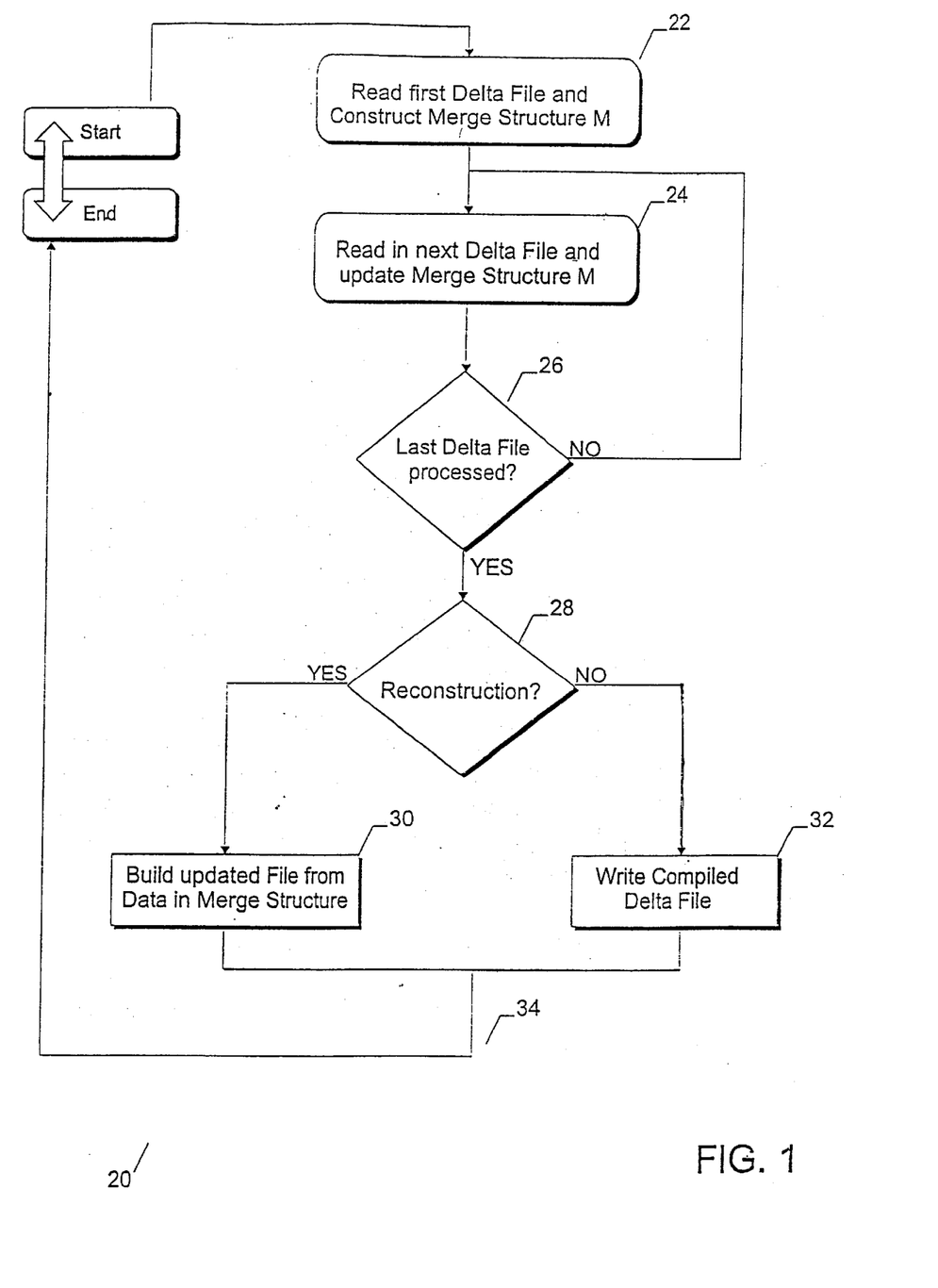
FIG. 1 is a flow chart representing a set of procedures embodying the invention.

Turning now to FIG. 1 of the accompanying drawings there is shown a set of procedures 20 for merging a sequence of delta files. The procedures 20 comprise at step 22 reading a first delta file and constructing a merge structure M therefrom. A merge structure is a data file containing information from several delta files and is created by reading all delta files in a set in order. The updated file of a delta file in a sequence forms the base file of the next delta file in the sequence. Thus, the next stage 24 in FIG. 1 is to read the content of the next delta file in the sequence and update the merge structure M, and then at stage 26 repeating the operation of stage 24 until all delta files have been read and the merge structure fully updated. Once the last delta file has been processed and the merge structure has been completed one of two actions may be performed depending on whether the result to be obtained is a reconstructed data file or a compiled delta file. A decision is taken at stage 28 in FIG. 1 and, if a reconstruction is required, at stage 30 the reconstructed updated data file is created from the data held in the merge structure. Otherwise, if a compiled delta file is required, the data in the merge structure is used at stage 32 to create the compiled delta file.

It will be noted from FIG. 1 that the procedure is able to merge delta files in such a way that only one delta file is required at any time. The procedure processes the delta files in the order they were created.

The merge structure is the accumulation of all the changes in all of the delta files used to create it. The merge structure is able to create the latest (or a later) version of a data file from an initial version of the data file. The initial data file may itself be a delta file. Thus, the merge structure is the sum of all delta files needed to create the latest (or later) version of the data file. The sizes of the original and later versions of a data file will (almost certainly) be different. One extra byte at the beginning of a file will not only change the size of the file but it will also change the position of every byte that follows. It is therefore necessary to make positional adjustments to the data as the merge structure is being created. This is achieved in the following manner.

Figure 2:
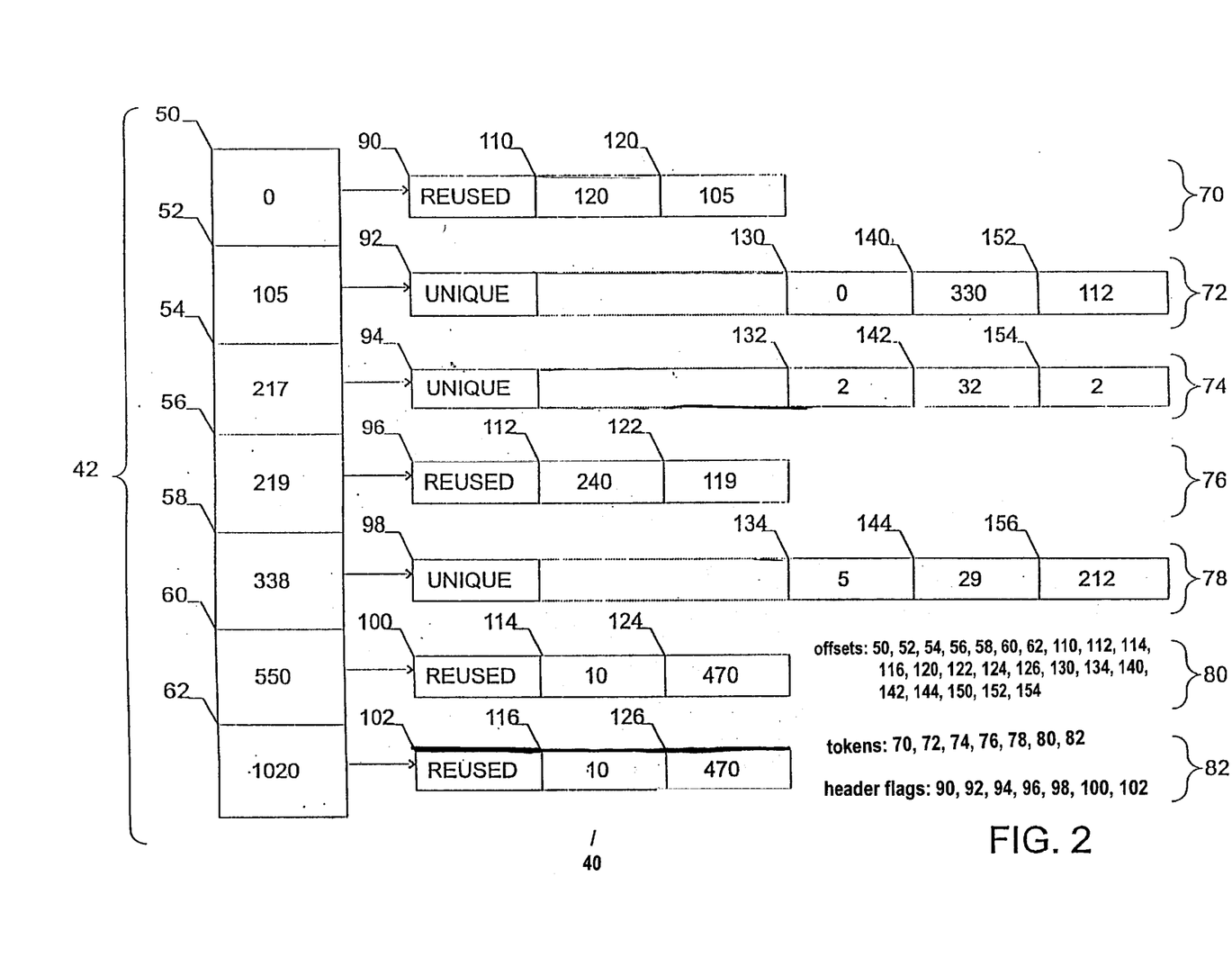
FIG. 2 is a schematic diagram of a merge structure.

Turning now to FIG. 2 of the accompanying drawings there is shown a merge structure 40 with sample entries. The merge structure comprises a list of entries or tokens 42, sorted by offsets 50, 52, 54, 56, 58, 60, 62 in either the reconstructed file generated at step 30 in FIG. 1, or the reconstructed file that could be generated by the compiled delta file produced at step 32 in FIG. 1. Each token 70, 72, 74, 76, 78, 80, 82 in the list 42 is either of type 'Reused' or of type 'Unique', identified by a header flag 90, 92, 94, 96, 98, 100, 102. In this context, 'REUSED' data is data that has been reused from the previous delta file in the sequence and 'UNIQUE' data is data that is defined uniquely in an earlier delta file.

Tokens of type 'Reused' 70, 76, 80, 82 contain an offset 110, 112, 114, 116 in the file containing the reused bytes and the number of bytes reused 120, 122, 124, 126. Tokens of type 'Unique' 72, 74, 78 contain the serial number 130, 132, 134 of the delta file in the plurality of sequential delta files where the unique bytes are held (or any other entry that identifies that delta file in the plurality of sequential delta streams), the offset 140, 142, 144 of the unique bytes in all unique bytes held in that delta file and the number 150, 152, 154 of unique bytes.

The merging of a sequence of delta files is broken down to merging two data structures (i.e. a delta file and the merge structure) by replacing all references to a previous delta file with a reference to the actual location where the bytes in question are held or by replacing those references with the bytes when the method is used in an environment where multiple accesses of delta files are not practical or are impossible (e.g. backup repositories held on magnetic tapes).

Figure 3:
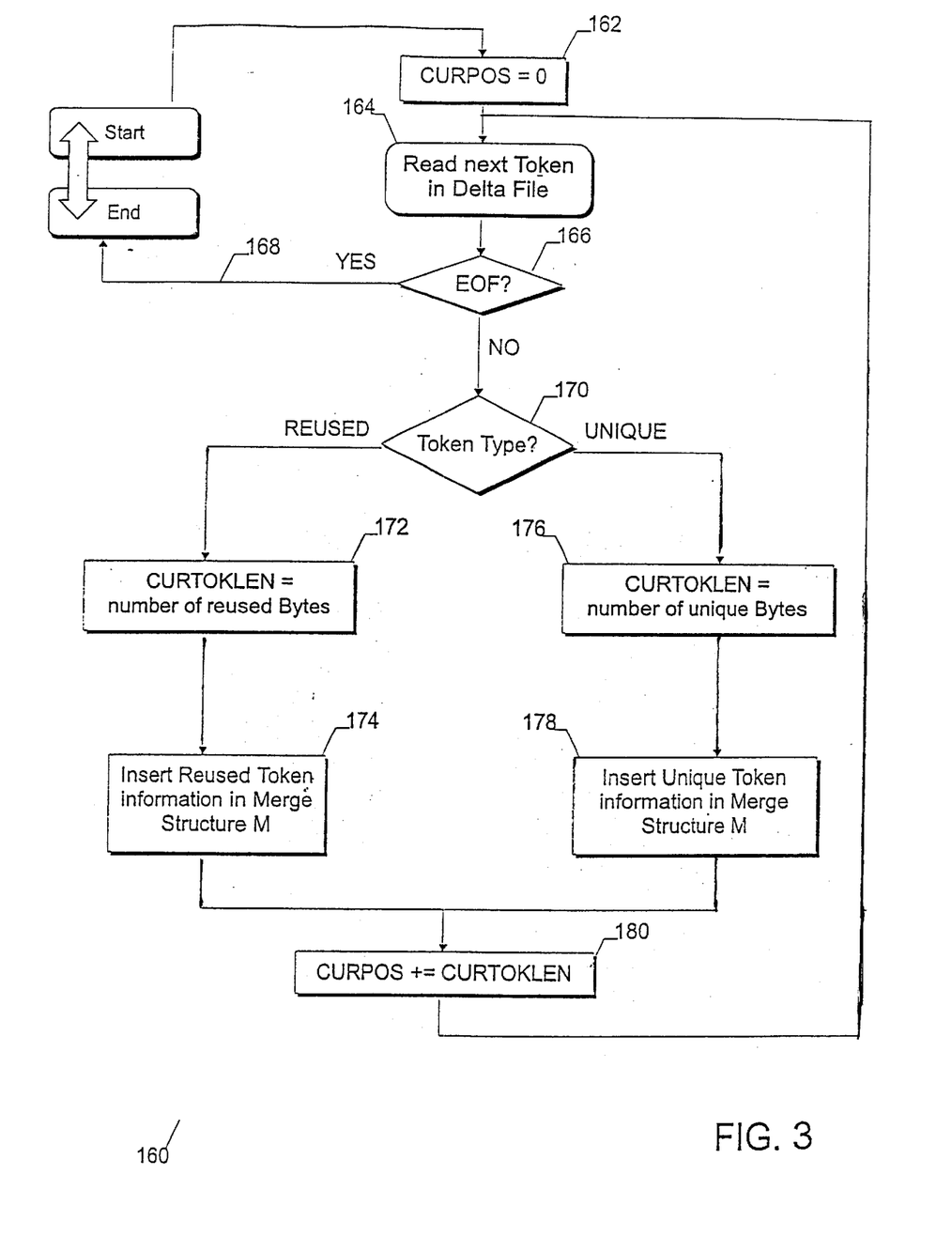
FIG. 3 is a flow chart representing operations for creating an initial merge structure.

Turning now to FIG. 3 of the accompanying drawings, the flow of operations 160 performed to build the initial merge structure from the first delta file in the sequential plurality of delta files (at stage 22 of FIG. 1) will be described. The flow of operations 160 begins with the initialisation of an offset CURPOS at stage 162. CURPOS is the offset of the current position in the updated file that was used to create the present delta file and is initially set to zero. At stage 164 the next token header flag is read. This might be preceded by reading a header flag of the delta file, or might be reduced to reading the header flag of a token. At stage 166 a test is performed for a special token indicating the end of the delta file. Alternatively, instead of having a special token indicating the end of the file, a test might be performed at the end of the procedure (after stage 180) if the last token of the file was read. If the end of the file is reached the procedure 160 is ended at 168.

Otherwise, the type of the token is queried 170. In case of a token of type 'REUSED', indicating reused bytes from the previous delta file, the number of bytes associated with this token CURTOKLEN is set at stage 172 to the number of reused bytes and a corresponding 'REUSED' entry is appended at stage 174 to the merge structure 40. Otherwise, the token is of type 'UNIQUE', and the number of bytes associated with the current token CURTOKLEN is set at stage 176 to the number of unique betes and a corresponding entry of type 'UNIQUE' is appended at stage 178 to the merge structure 40. In both cases, the current position CURPOS is incremented at stage 180 by CURTOKENLEN and the procedure continues with reading the next token at stage 164.

Figure 4:
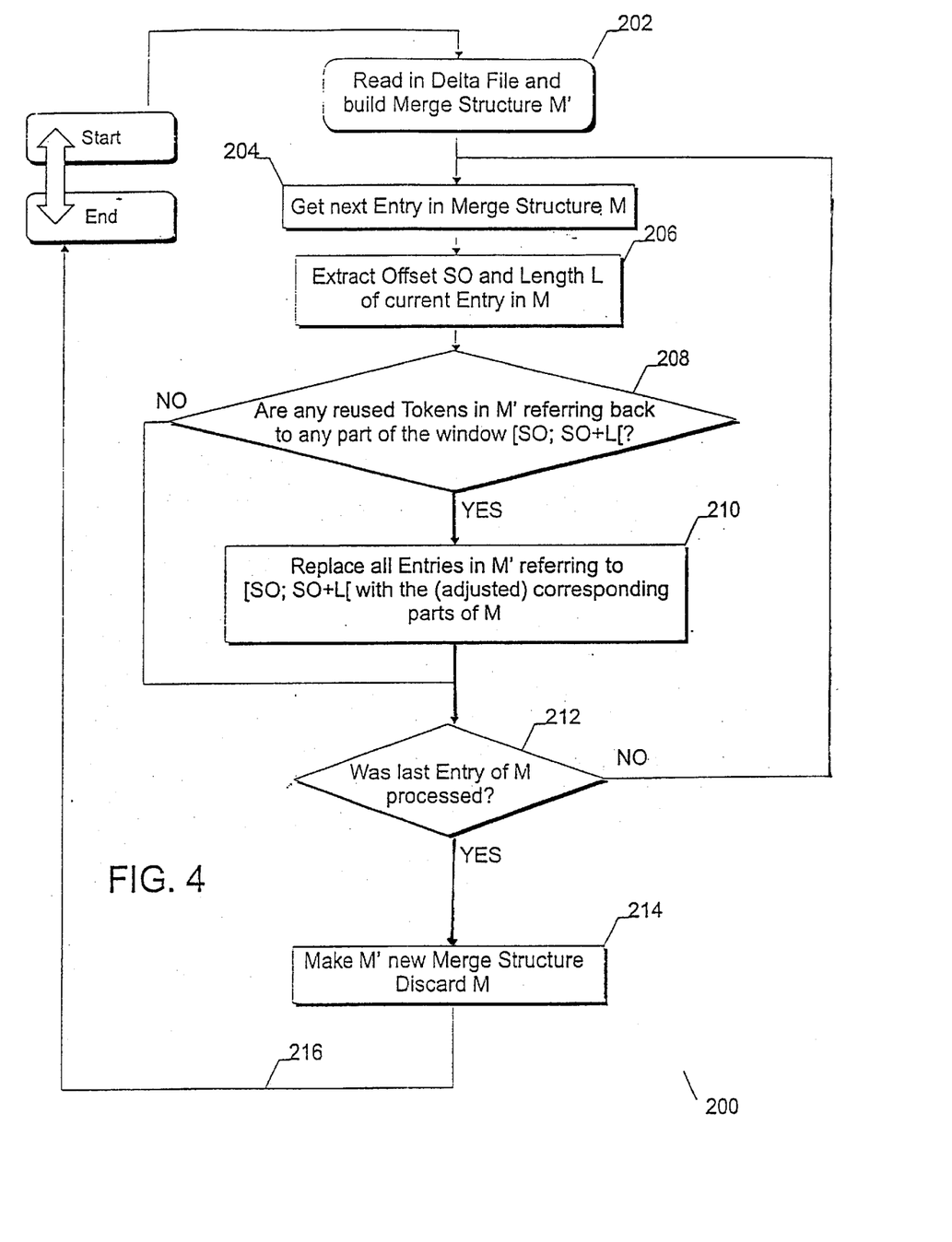
FIG. 4 is a flow chart representing operations for updating a merge structure with a delta sequence.

Turning now to FIG. 4 of the accompanying drawings, there is shown a flow of operations 200 that may be performed to update the merge structure with the next delta file in the sequence. At stage 202 the new delta file is read using flow 160 illustrated in FIG. 3, and a second merge structure M' is created. Once the initial merge structure M and the second merge structure M' have been thus created, the next token or entry (or, at the beginning of the process, the first token or entry) of the initial merge structure M is read at stage 204 to obtain at stage 206 its start offset SO and its length L. A test is then performed at stage 208 to find out if any entries of type 'REUSED' in the second merge structure M' refer back to any part of a window defined from the offset SO to the offset SO+L+1 in the initial merge structure M. If this is the case, the entries in the second merge structure M' are replaced at stage 210 by the corresponding entry or adjusted parts of one or more corresponding entries in the initial merge structure M. In both cases execution continues with testing at stage 212 to determine whether the last entry of M has been processed. If the last entry has not been processed the procedure returns to stage 204 and continues with the next entry in M. Otherwise, at stage 214, the initial merge structure M is discarded and replaced by what was the second merge structure M' before finishing at stage 216. When this stage 216 is reached, all parts of the base file have been processed.

The use of 'REUSED' tokens is inefficient. A 'REUSED' token refers back to a block of data in the immediately preceding version of the file, and that block of data in itself may include 'REUSED' tokens which refer to still earlier versions of the file. Thus, access may be required to several delta files until the token identifying the 'UNIQUE' data is actually found. This is wasteful of resources. The aim therefore is to replace all 'REUSED' tokens with 'UNIQUE' tokens. It should be noted that in the case where the sequential plurality of delta files started with a delta file without any backward references (e.g. the first version of a backed up file), no 'REUSED' entries are left at all once the procedure in FIG. 4 has been executed for all delta files.

The merge structure M, once completed for all delta files, may be used either to build the latest (or later) version of the data file from the initial data file (step 30 in FIG. 1) or to build a compiled delta file (step 32 in FIG. 1). A compiled delta file may be required for example to reduce (to 1) the number of delta files defining changes between the initial data file and the latest (or later) version of the data file. This would be desirable to reduce storage overheads in the event that intermediate versions were no longer required. A compiled delta file may also be required for example if the initial file is itself a delta file.

Figure 5:
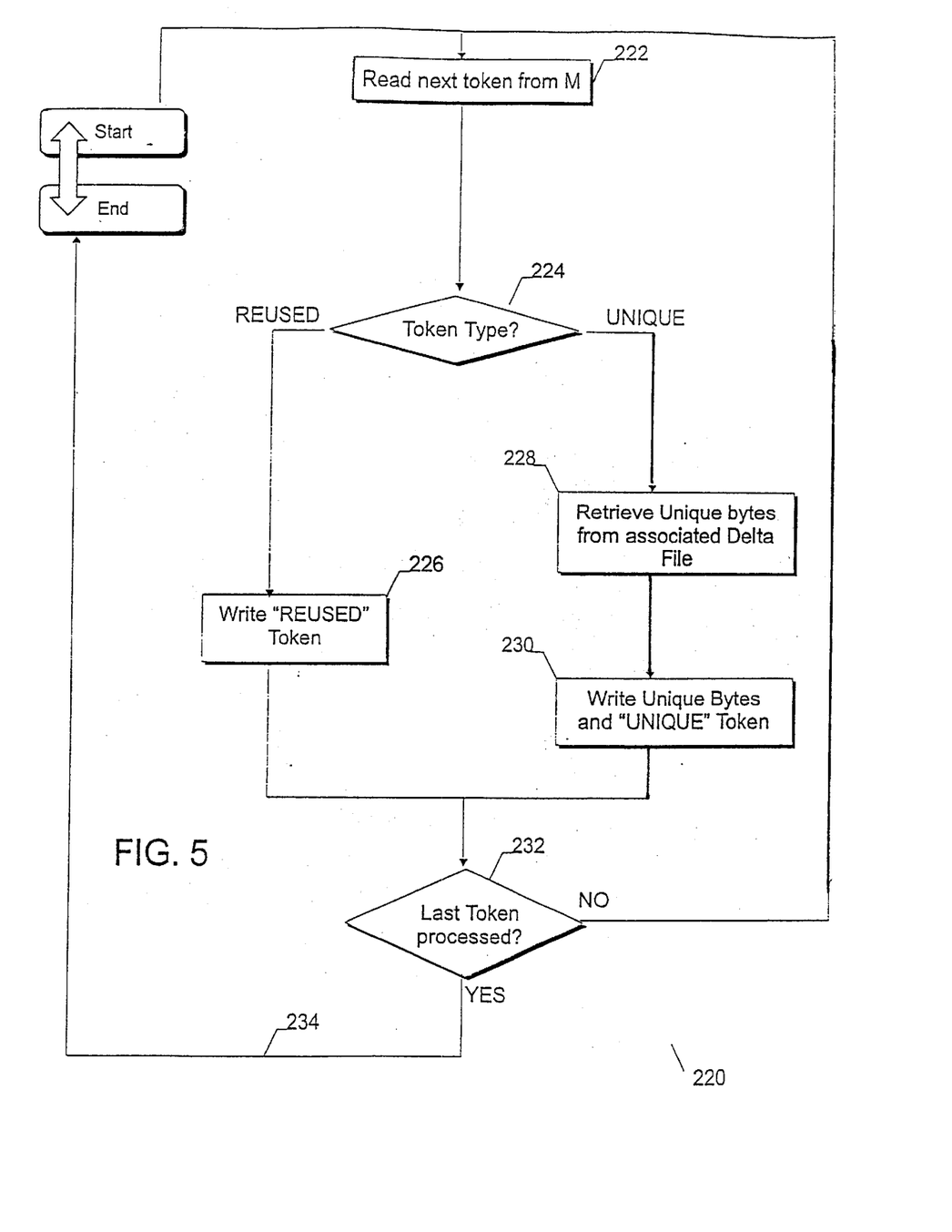
FIG. 5 is a flow chart representing operations for creating a compiled delta file.

FIG. 5 of the accompanying drawings illustrates the flow of operations 220 that may be performed to write a compiled delta file or stream once a merge structure M has been created. At stage 222 the first or next token entry (the first one at the beginning of the process) in the merge structure M is read. A decision is made at stage 224 depending on its type. If the token is a 'REUSED' token, it is written at stage 226 to a compiled data file. If the token is a 'UNIQUE' token, the unique bytes are retrieved at stage 228 from the associated delta file and at stage 230 the unique bytes are written, together with a 'UNIQUE' token, to the compiled delta file. In both cases a test for the last entry in the merge structure M is performed at stage 232. The procedure finishes at stage 234 if the last token has been processed, otherwise, the procedure returns to stage 222 and execution continues with the next entry in the merge structure M.

The procedure for reconstruction of a file follows the same algorithm as that just described for compiling a delta file, but without the writing of tokens. As the sequential plurality of delta files must start with the very first version of the file to be reconstructed, no 'REUSED' entries in M will be encountered. Therefore, only unique bytes are written in the reconstructed file. Once the combined delta file or the updated data file has been created the sequence of delta files may be deleted and replaced with the one combined delta file without losing the capability to restore later versions.

While the above described procedures provide an efficient way to merge delta files in environments or media where delta files are seekable and can be accessed several times (to retrieve updated bytes when the resulting compiled delta file or reconstructed file is written to disk), such multiple accessing might be impracticable in other cases, e.g. backup repositories held on magnetic tapes. The method can, however, still be used by caching the unique bytes in memory or on a seekable medium while consecutive delta files are processed.

The memory requirements of the merge structure can be reduced in the following manner if the merge structure is implemented on a seekable medium.

Figure 6:
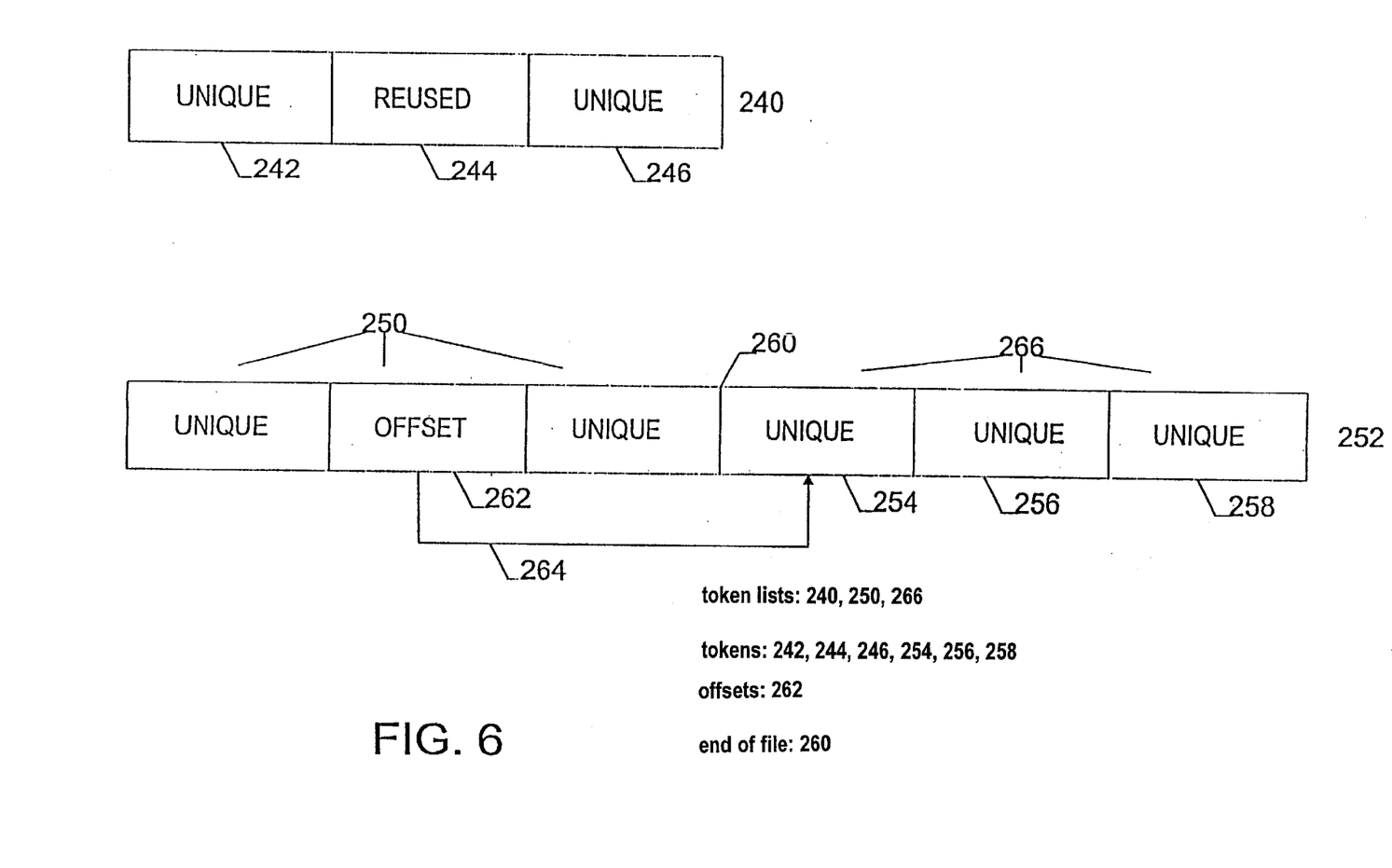
FIG. 6 illustrates an exemplary merge structure file with offset tokens to appended entries.

Turning now to FIG. 6 of the accompanying drawings, there is shown data structure held in a file that can replace the aforementioned, memory-held merge structure. Instead of building a merge structure in memory from a delta file, a merge structure file is created which initially holds a list 240 of tokens 242, 244, 246 where the number of bytes used to store each token is big enough to hold 1) all information associated with an entry in a normal merge structure or 2) an offset in the merge structure file together with an identifier that signals the presence of an offset instead of a 'UNIQUE' or'REUSED' entry.

In order to replace a 'REUSED' entry in the token list 250 of a Merge Structure File 252 with one or more tokens 254, 256, 258, the 'REUSED' entry is overwritten by an 'OFFSET' entry 262 pointing 264 to the end 260 of the Merge Structure File, where the new entries 254, 256, 258 are appended. Additionally, a special entry signalling the end of the list 266 of entries 254, 256, 258 replacing a token might be appended to the end of the file.

It will be appreciated from the foregoing that tokens are maintained in delta files in such a way that a restore operation only requires those delta files that hold unique bytes actually used in the version to be restored. The same method can be used for deleting intermediate versions. This enables a data structure filled by information from the first of a sequence delta files to be created. The data structure is then updated by consecutively reading and analysing the remaining delta files. The data structure might be held in a disk file or, for additional performance, in memory. The merging sequence of delta files may be used to create one or more bi-directional delta files which allow reconstruction of updated files with reduced I/O operations, or even bi-directional delta files without any references to previous delta files. Bi-directional delta files allow reconstruction of a base file given the updated file and the special bi-directional file as will now be described.

Figure 7:
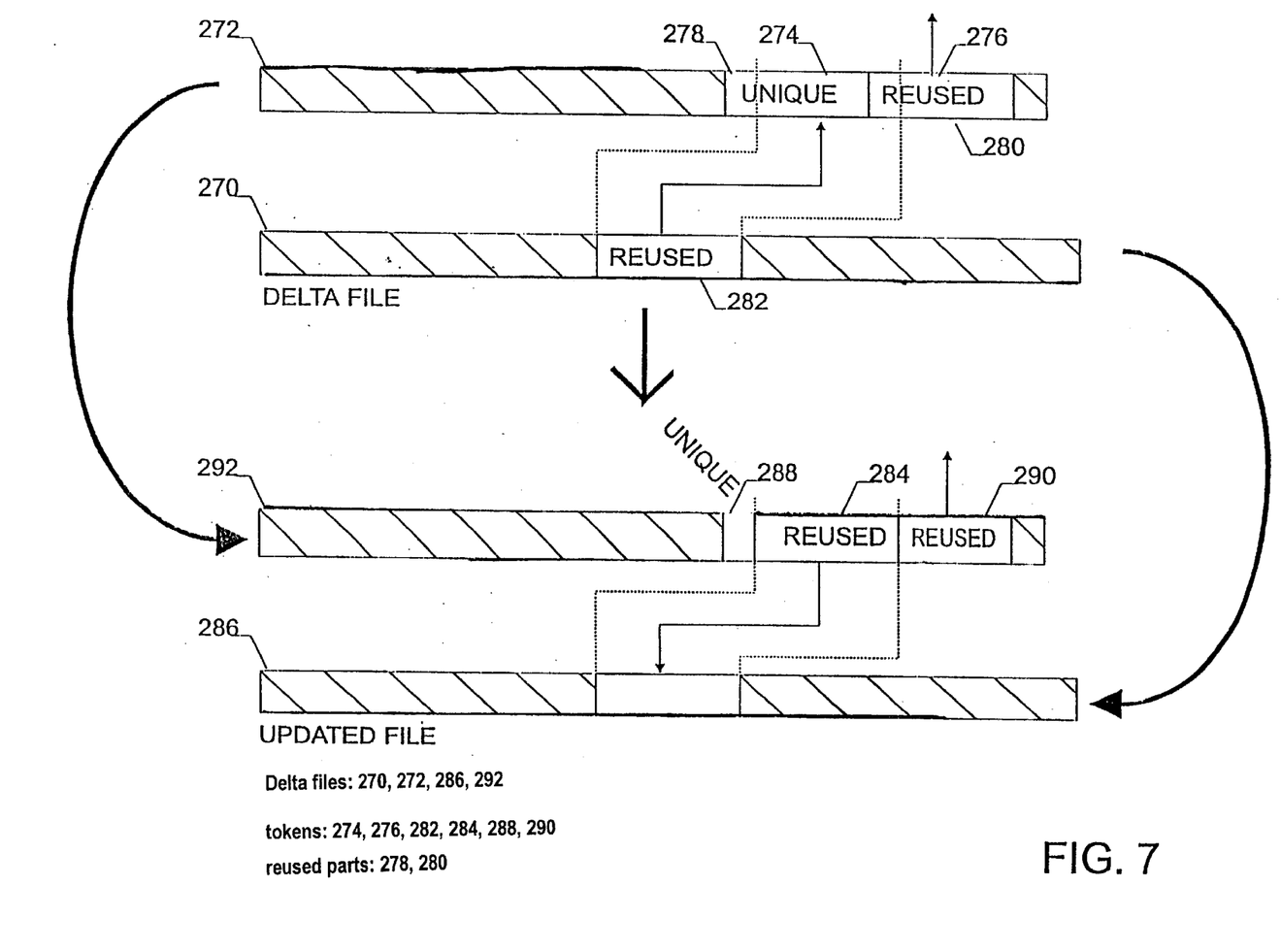
FIG. 7 represents the creation of a bi-directional delta file.

Turning now to FIG. 7 of the accompanying drawings, there is illustrated an additional step that may be performed to create a bi-directional delta file when delta files are merged. When a delta file 270 is read in and transformed in a merge structure, 'REUSED' tokens referring back to the previous delta file 272 are detected. FIG. 7 illustrates the procedure performed for every 'REUSED' token using one example 282. The 'REUSED' token might refer back to an area covered by several tokens 274, 276 in the previous delta file 272, and those tokens might be of type 'REUSED' (276) or 'UNIQUE', (274) and they might have parts 278, 280 that are not included in the reused block. The reused parts of tokens 274, 276 are replaced by a special 'REUSED' token 284 referring forwards to the updated file 286. Non-reused parts 278, 280 of partly reused tokens 274, 276 are replaced by tokens 288, 290 of smaller blocks of data of corresponding type. After this operation has been performed for all reused blocks in the delta file 270, the resulting token list 292 can be written to disk as a bi-directional delta file using a method similar to the one described with reference to FIG. 5.

In order to create a bi-directional delta file without any references to previous delta files, which allows reconstruction of the base file without accessing any previous delta files, the replacement of unique tokens 274 in the base file 272 is performed as shown in FIG. 4, before the replacement of parts reused in the next delta file is started. This ensures that no references to previous delta files are left in the bi-directional delta file, provided the firsts delta file in the sequential plurality of delta files did not have any references to other delta files or streams.

A variation of the foregoing method can be used to improve performance and reduce I/O operations, particularly in cases where files change more than normally expected and delta files therefore hold more information in unique bytes. It is required that each delta file holds a reference to the previous delta file to which reused blocks refer. Before the method is applied to merge the sequential plurality of delta files, a backward scan through the delta files is performed to obtain the first delta file in the sequential plurality of delta files that actually holds unique bytes which still appear in the updated file associated with the last delta file. Where this is not the first delta file in the sequence of files, the procedure can be used on the part of the sequence of files which contains only delta files starting from the first delta file with needed unique bytes and all subsequent delta files. Alternatively, delta files may hold information about the chain of previous delta files needed to restore the associated updated file, in which case the backward scan degenerates to retrieving this information from the last delta file in the sequence.

Figure 8:
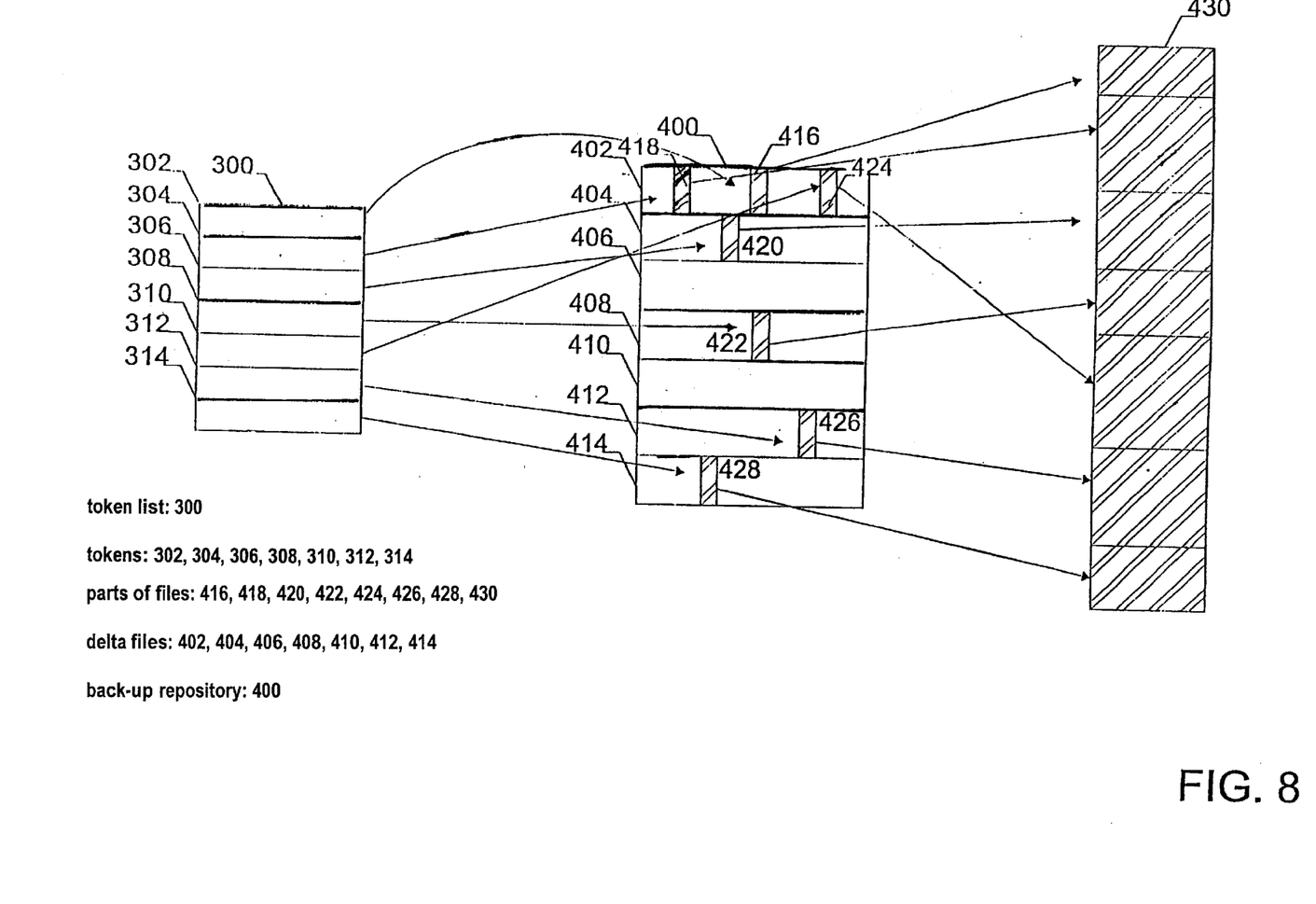
FIG. 8 represents a sequence of operations for restoring a file.

The tokens associated with a delta file hold information about the particular version the unique bytes involved are held in. This enables restores and deletes to access only those delta files that are needed for the operation without having to scan through other delta files. Thus, efficiency may also be improved by eliminating all access to delta files which are not used during a restore or delete operation. FIG. 8 of the accompanying drawings illustrates the operations performed when the (most efficient) approach is used which holds information about the version that defines a particular range of unique bytes in the token table associated with a delta file. The token list 300 consists of tokens 302, 304, 306, 308, 310, 312, 314 which hold information about the particular version of a file. The bytes associated with each token are defined and that information allows the location and retrieval of the necessary bytes from delta files to be achieved in an efficient way. Tokens for the delta file associated with the token table 300 can be left out if they represent bytes defined in the current delta file, as bytes that are not defined by a token in the list must necessarily be defined in the current delta file. Thus, to restore the delta file associated with the token table 300, the bytes needed are retrieved from the backup repository 400. This is done by using the information held in the tokens to retrieve exactly the parts 416, 418, 420, 422, 424, 426, 428 of the delta files 402, 404, 408, 412, 414 needed, thus unneeded delta files 406, 410 need not be accessed. The retrieved bytes are then placed in the restored file 430.

The operations performed for deleting intermediate delta files are quite similar to those described above.

To create a token table as described above, the apparatus creating the delta file would have to know the token table of the. previous delta file. Another approach is to create a delta file with a provisional token table (which would be similar to the one described in our aforementioned co-pending patent application) which points back in the previous version only. This provisional token table is then replaced by a token table as described above by applying a simple replacement operation in the backup repository. This replacement operation only needs to read the provisional token table and the token table of the previous delta file. With both tables, the new token table can be constructed and replaces the provisional table.

In cases where token tables are stored as part of a delta file and data is typically stored compressed and/or encrypted, overhead can be reduced by compressing/encrypting the delta bytes and the token table separately. Thus, to read the token table, it is not necessary to decompress/decrypt the delta bytes.

To reduce storage space taken up by token tables, special codes can be used to save special patterns, for example a part of a previous version that is reused several times (run-length encoding).

To increase performance further, especially in cases where intermediate versions are deleted regularly, and to limit the number of delta files that need to be read to restore a particular version or to delete intermediate versions, a certain fraction of an updated file can always be stored as unique bytes, regardless of whether the actual contents is part of a previous version or not. For example, every backed up version would consist of at least 20% unique bytes, interleaved in such a way that five delta files are always enough to restore a particular version. This increases storage space, transmission time and performance.

Whereas our aforementioned co-pending patent application describes mostly tokens that are specialised for a fixed size of blocks, the aforementioned method and apparatus is not limited to fixed blocks. Different amounts of reused and unique bytes can be used in the same delta file and token table.

The foregoing methods, procedures and algorithms may be effected using apparatus such as a suitably configured computer or computers. The invention may be embodied in such apparatus and therefore extends to such apparatus.

Having thus described the invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

What is claimed is:

1. A method of merging a sequence of delta files that together define a series of changes between a base file and an updated file, each delta file defining one or more changes in terms of one or more unique tokens each identifying original data or of one or more reuse tokens identifying data reused from the immediately preceding delta file or the base file, the method comprising:

creating an initial merge structure from the base file and the first delta file in the sequence;

creating a further merge structure from the initial merge structure and the next delta file in the sequence by comparing tokens in the initial and further merge structures and replacing reuse tokens in the further merge structure with tokens in the initial merge structure;

replacing the initial merge structure with the further merge structure so that the further merge structure becomes the initial merge structure; and repeating the operations of creating a further merge structure and replacing the initial merge structure with the further merge structure, for all delta files in sequence order, whereby the thus created merge structure represents all changes between the base file and the updated file;

identifying a file position corresponding.

2. A method as claimed in claim 1, wherein the base file is itself a delta file which defines one or more changes to a preceding delta file or base file.

3. A method as claimed in claim 1, wherein the base file is an initial data file and the thus created merge structure represents all changes in terms of unique tokens, whereby an updated data file can be created from the initial data file and the thus created merge structure.

4. A method as claimed in claim 1, wherein each reuse token comprises a reuse token indicator, an offset value identifying the position of bytes in another delta file or the base file and a number value representing the number of bytes associated with the position identified by the offset value.

5. A method as claimed in claim 1, wherein each unique token comprises a unique token indicator, a file identifier for identifying the file containing unique data for the thus created merge structure, an offset value identifying the position of bytes in another delta file or the base file and a number value representing the number of bytes associated with the position identified by the offset value.

6. A method as claimed in claim 1, further comprising:

defining for each token in the further merge structure a window of locations in the initial merge structure from data associated with the token in the further merge structure;

identifying for each window in the initial merge structure the or each token in the further merge structure that refers to data in the window; and replacing thus identified tokens in the further merge structure with data derived from tokens in the window of the initial merge structure.

7. A method as claimed in claim 1, further comprising:
identifying reuse tokens in a merge structure;
appending in the merge structure the unique token or tokens to which the reuse token pertains; and
replacing the reuse token with an offset token which comprises a pointer that identifies the position at which the unique token or tokens are appended in the merge structure.

8. A method as claimed in claim 7, wherein the unique token or tokens are appended at the end of the merge structure.

9. A method as claimed in claim 1, further comprising:
for each delta file identifying reuse tokens therein; and
for each identified reuse token modifying the token, tokens or token portions in the preceding delta file to which the reuse token pertains by replacing the same with a forward reuse token which identifies the reuse token in the delta file, thereby to create bi-directional delta files.

10. A method as claimed in claim 9, further comprising, when an identified reuse token in the delta file pertains to a portion of one or more tokens in the preceding delta file, modifying the remaining portion of the one or more tokens to which the reuse token does not pertain.

11. A method as claimed in claim 1, further comprising reviewing tokens in the created merge structure to identify as redundant those delta files to which no reference is made.

12. A method as claimed in claim 11, further comprising deleting redundant delta files.

13. A method as claimed in claim 1, further comprising saving the created merge structure.

14. A method as claimed in claim 1, further comprising using the created merge structure to create the updated file from the base file.

15. A method of creating a current file from an initial file and a set of difference files that defines a sequence of changes between the initial file and the current file, the method comprising:
merging the difference files according to the method as claimed in claim 1 so as to remove redundant information therefrom and thus create a changes file representing all changes to be applied to the initial file in order to arrive at the current file; and
modifying the initial file using the information in the changes file.

16. A method as claimed in claim 15, wherein each difference file comprises one or more sets of information each defining changes in a block of data at a position in an earlier difference file or in the initial file, and the initial file is modified by effecting the changes defined by the sets of information.

17. A method as claimed in claim 16, wherein one or more of the sets of information includes information which identifies the location of data for the current file from a specified difference file or the initial file.

18. An apparatus for merging a sequence of delta files that together define a series of changes between a base file and an updated file, each delta file defining one or more changes in terms of one or more unique tokens each identifying original data or of one or more reuse tokens identifying data reused from the immediately preceding delta file or the base file, the apparatus comprising:
means for creating an initial merge structure from the base file and the first delta file in the sequence;
means for creating a further merge structure from the initial merge structure and the next delta file in the sequence by comparing tokens in the initial and further merge structures and replacing reuse tokens in the further merge structure with tokens in the initial merge structure;
means for replacing the initial merge structure with the further merge structure so that the further merge structure becomes the initial merge structure; and
means for repeating the operations of creating a further merge structure and replacing the initial merge structure with the further merge structure, for all delta files in sequence order, whereby the thus created merge structure represents all changes between the base file and the updated file;
means for identifying a file position corresponding.

19. An apparatus as claimed in claim 18, further comprising:
means for defining for each token in the further merge structure a window of locations in the initial merge structure from data associated with the token in the further merge structure;
means for identifying for each window in the initial merge structure the or each token in the further merge structure that refers to data in the window; and
means for replacing thus identified tokens in the further merge structure with data derived from tokens in the window of the initial merge structure.

20. An apparatus as claimed in claim 18, further comprising:
means for identifying reuse tokens in a merge structure;
means for appending in the merge structure the unique token or tokens to which the reuse token pertains; and
means for replacing the reuse token with an offset token which comprises a pointer that identifies the position at which the unique token or tokens are appended in the merge structure.

21. An apparatus as claimed in claim 20, wherein the means for appending is arranged to append the unique token or tokens at the end of the merge structure.

22. An apparatus as claimed in claim 18, further comprising:
means for identifying, for each delta file, reuse tokens therein; and
means for modifying for each identified reuse token, the token, tokens or token portions in the preceding delta file to which the reuse token pertains by replacing the same with a forward reuse token which identifies the reuse token in the delta file, thereby to create bi-directional delta files.

23. An apparatus as claimed in claim 22, further comprising means for modifying, when an identified reuse token in the delta file pertains to a portion of one or more tokens in the preceding delta file, the remaining portion of the one or more tokens to which the reuse token does not pertain.

24. An apparatus as claimed in claim 18, further comprising means for reviewing tokens in the created merge structure to identify as redundant those delta files to which no reference is made.

25. An apparatus as claimed in claim 24, further comprising means for deleting redundant delta files.

26. An apparatus as claimed in claim 18, further comprising means for saving the created merge structure.

27. An apparatus as claimed in any of claim 18, further comprising means for using the created merge structure to create the updated file from the base file.

28. An apparatus for creating a current file from an initial file and set of difference files that defines a sequence of changes between the initial file and the current file, the apparatus comprising:

apparatus according to claim 18 for merging the difference files to remove redundant information therefrom and thus create a changes file representing all changes to be applied to the initial file in order to arrive at the current file; and     means for modifying the initial file using the information in the changes file.

29. An apparatus as claimed in claim 28, wherein each difference file comprises one or more sets of information each defining changes in a block of data at a position in an earlier difference file or in the initial file, and the means for modifying the initial file is arranged to effect the changes defined by the sets of information.

* * * * *